Jan. 9, 1923.

B. PARKER.
ANIMAL TRAP.
FILED APR. 26, 1921.

1,441,998.

Inventor
Benjamin Parker
By
Attorney

Patented Jan. 9, 1923.

1,441,998

UNITED STATES PATENT OFFICE.

BENJAMIN PARKER, OF KELMSCOTT, WESTERN AUSTRALIA, AUSTRALIA.

ANIMAL TRAP.

Application filed April 26, 1921. Serial No. 464,534.

*To all whom it may concern:*

Be it known that I, BENJAMIN PARKER, a subject of the King of Great Britain, residing at Braeside, Kelmscott, Western Australia, Commonwealth of Australia, have invented certain new and useful Improvements in Animal Traps, of which the following is a specification.

This invention relates to traps and the primary object of the same is to provide a device of this class of an effective and reliable character for trapping animal and bird pests, such as rats, mice, wild dogs, parrots and hogs. A further object of the invention is to provide a trap which, after it has been primarily manually set, operates in an automatic manner by the animal or bird entering the same and resulting in a self-imprisonment of the trapped animal or bird as well as a resetting of the trap in receptive condition for entrance thereinto of another pest of the type specified.

The invention consists in the construction and arrangement of the several parts which will be more fully hereinafter described and claimed.

Figure 1:
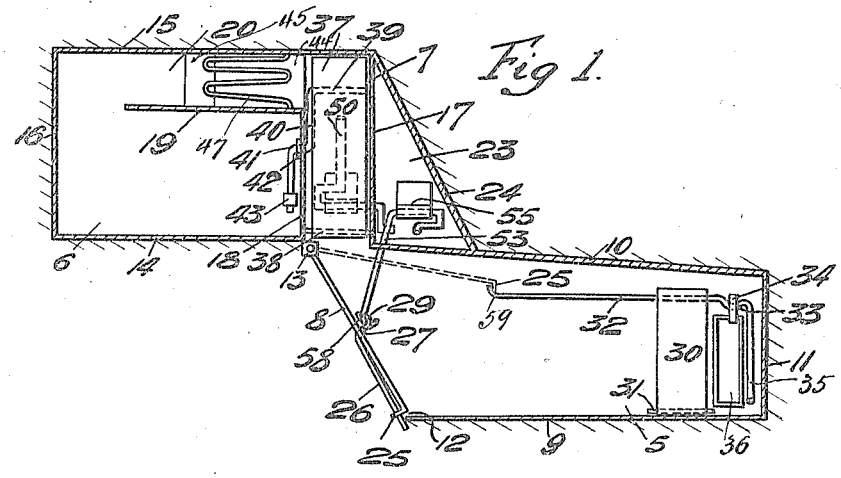
Fig. 1 is a top plan view of a trap embodying the features of the invention and showing the roof or top covering removed.
Figure 2:
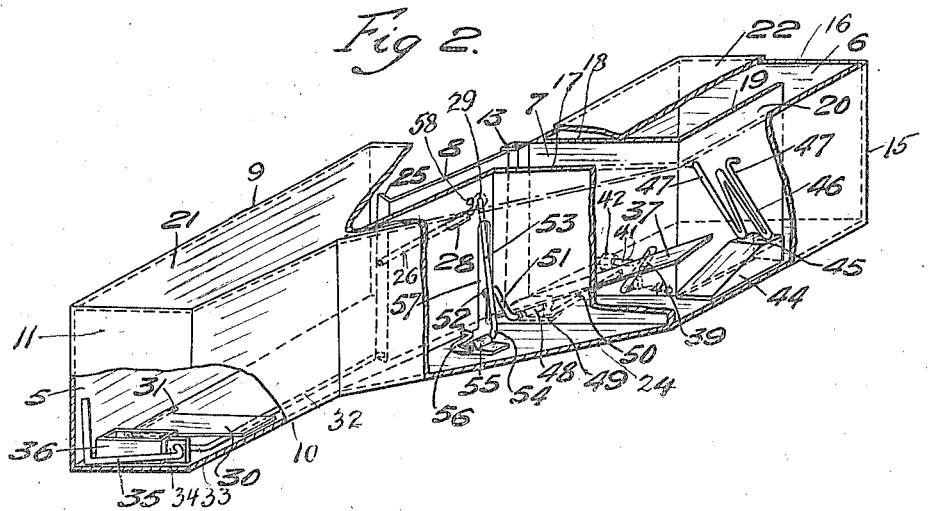
Fig. 2 is a sectional perspective view of the improved trap, the roof or top cover being partially shown in place thereon and the trap set for entrance thereinto of an animal or bird.

The improved trap comprises a receiving enclosure 5, an imprisoning enclosure 6, a connecting passageway 7 between the two enclosures, and a door or gate 8 automatically operative to control the entrance to the receiving enclosure 5 and the passage of the trapped animal or bird from the latter enclosure into the passage 7 and eventually into the imprisoning enclosure 6. The side walls 9 and 10 of the receiving enclosure 5 diverge from a rear closed end 11 to an entrance opening 12 with which the door or gate 8 cooperates. The door or gate 8 is hinged to a post or support 13 at one side of the entrance to the passage 7 from the receiving enclosure 5, this door or gate being primarily hung out of true so that when it is opened as shown by Fig. 2, it will stand at a slight upward angle of inclination within the receiving enclosure 5, and whereby when the said door or gate is released from open position it will automatically swing to closed position as shown by Fig. 1. The side and end walls 14, 15 and 16 of the imprisoning enclosure 6 are of the same vertical extent as the walls 9, 10 and 11 of the receiving enclosure 5, the walls 14 and 15 being preferably parallel. The passageway 7 is provided by a vertical wall 17 angularly intersecting the terminal of the one side wall 10 of the receiving enclosure 5 and by an inner wall 18 angularly intersecting the side wall 14 of the imprisoning enclosure 6, the wall 18 extending only part way across the enclosure 6 and having a longitudinal partition wall 19 angularly intersecting the same and spaced from the side wall 15 of the enclosure 6 to form a passage 20 which fully opens at one end into the rear portion of the passage 7 and at its opposite end into the said enclosure 6. The walls of the receiving and imprisoning enclosures are adapted to have roof or cover walls 21 and 22 respectively applied thereover and also over an angular enclosure 23 for part of the working mechanism and which is formed by the wall 17, a portion of the wall 10 and an angular or diagonally arranged wall 24, as clearly shown in Fig. 1. The gate 8 is also formed at its free edge with an angular flange 25, and applied to this gate is a sliding bolt 26 which is projectible through and beyond the flange 25 to engage the free edge of the side wall 9 at the inlet opening 12. The bolt 26 is mainly applied against the outer side of the door or gate 8 and has its inner extremity angularly bent inwardly, as at 27, and movable through a slot 28 formed in the said door or gate, the inner free end of the bolt being shaped as a connecting hook 29.

The movable mechanism comprises a tread plate 30 mounted on the bottom of the receiving enclosure adjacent to the rear closed end 11 of the latter, the said plate 30 being pivoted, as at 31, adjacent to the base of the side wall 9 and extending across the receiving enclosure and having a free end projecting over a locking trip rod 32 extending substantially longitudinally of the receiving chamber 5 and formed with a crank 33 mounted in a suitable bearing 34 at a distance rearwardly from the plate 30 and terminating in an angular counterpoise arm 35, which is positioned as shown by Fig. 2 when the trap is primarily manually set. Adjacent to the tread plate 30 is a bait box 36 of suitable structure in which any desirable form of bait may be placed for enticing the animals or birds into the receiving enclosure 5. Within the passageway 7 is an upwardly and rearwardly inclined tread plate 37 pivoted at its lowermost end at the entrance to said passage 7, as at 38, the tread plate 37 normally projecting upwardly from its pivotal point towards the rear end of the passage 7. A counterpoise arm 39 extends under and close to the normally elevated rear extremities of the tread plate 37 and is continuous with a longitudinal member 40 having an intermediate crank 41 mounted in a bearing 42 at a suitable elevation in the wall 18, the forward free end of the arm 40 being provided with a counterpoise weight 43. This arm 39 continuous with the longitudinal member 40 having the intermediate crank 41 operates to raise the tread plate 37 to normal position after it has been depressed and the weight of the animal or bird relieved therefrom, and whereby the rear elevated extremity of the tread plate 37 is normally maintained at an elevation a considerable distance above the bottom of the passage 20. In the passage 20 is an upwardly inclined block 44 which is essentially of wedge shape and has its reduced end at the entrance to said passage, or at the point where the passage 20 communicates with or opens into the rear portion of the passage 7. At its outer extremity the block 44 has a flat surface 45 with which the lower free end of a swinging looped wire gate 46 has engagement, so as to maintain the said gate at a downward and outward angle of inclination. The gate 46 has side members 47 fulcrumed at a suitable elevation above the block 44 in the partition wall 19 and the one side wall 15 of the imprisoning enclosure 6. The object of the gate 46 is to prevent an animal or bird passing the same into the imprisoning enclosure 6 from returning into the passageway 7.

The door or gate 8 and the slide bolt 26 are operated through the medium of the actuation of the tread plate 37 by the animal or bird moving over the latter, and beneath the said tread plate 37 near the hinged pivot or fulcrum therefor a crank shaft or rod 48 is mounted in a suitable bearing means 49 secured on the floor of the passageway 7, said crank shaft or rod 48 having an arm 50 extending upwardly under and normally engaging the under side of the tread plate 37 in advance of the engagement with said plate of the arm 39. The opposite extremity of the crank shaft or rod 48 is formed as a crank arm 51 which has a right-angular bearing terminal 52 to loosely engage a gate operating rod 53 having a lower angular extremity 54 held by a suitable bearing 55 in which the said angular extremity has movement, the angular extremity being continued into a counterpoise or weighted angular member 56. The gate operating rod 53 has unrestricted movement through a slot 57 formed in the portion of the side wall 10 of the receiving enclosure 5 adjacent to and intersecting the forward terminal of the wall 17. The upper end of the rod 53 is hooked or bent, as at 58, to interlock with the inner hooked extremity or terminal 29 of the bolt 26. The rod 53 not only normally extends upwardly at an angle of inclination towards the door or gate 8 and is connected to the inner end or extremity of the bolt 26, but also has a general diagonal disposition, and always engaging the outer portion of this rod 53 is the angular bearing terminal 52 of the crank 51 formed as a part of the crank shaft or rod 48.

As hereinbefore set forth, the trap is primarily manually set after suitable bait has been deposited in the box 36. In setting the trap the door or gate 8 is first released manually by sliding the bolt rearwardly thereover and pushing the door or gate inwardly, as indicated by dotted lines in Fig. 1, and causing the outer free end of the trip rod 32, which is suitably bent, as at 59, to engage the flange 25. This adjustment of the trip rod 32 is accomplished through manual operation of the tread plate 30, and after the door or gate 8 has been thus locked open, it will stand across the entrance to the passageway 7 and at the same time the gate operating rod 53 will occupy the position shown by Fig. 2 and at which time the bolt 26 will be fully drawn inwardly. After the trap has thus been primarily set, the entrance of an animal or bird into the receiving enclosure 5 to reach the bait in the box 36 effects a release of the door or gate 8, in view of the fact that the animal or bird must pass over the tread plate 30 and depress the latter, thereby turning the trip rod 32 sufficiently to disengage the end 59 thereof from the flange 25 of the said door or gate, and owing to the manner of hanging the door or gate as hereinbefore explained, it will automatically close and the rod 53 gradually follows the gate and assumes the position shown by Fig. 1, and just as the door or gate is closed the bolt 26 will be moved outwardly and lock the door or gate against inward opening movement. The door or gate 8 will remain in this locked condition as long as the bird or animal remains in the receiving chamber 5. The movement of the bird or animal from the tread plate 30, which will be caused by the habit of the animal or bird to escape, will cause the rod 52 to be automatically reset through the counterpoise angular arm 35 and ready for engagement of the bent end 59 of the said rod 32 when the door or gate is afterwards opened. The animal or bird finding all egress of escape cut off will naturally enter the passage 7 and move upwardly over the tread plate 37, thereby depressing the latter and again operating the rod 53 to draw inwardly on the bolt 26 and release the door or gate and the continuous drawing action on the said rod 53 will also result in a full opening movement of the door or gate and re-engagement therewith of the bent end 59 of the trip rod 32. The animal or bird moving rearwardly over the tread plate 37 will depress the latter at its rear extremity against the resistance of the counterpoise in connection therewith hereinbefore explained, and from this tread plate the bird or animal will enter the passage 20 and open the gravitating gate 46 and eventually become imprisoned in the enclosure 6. The opening of the door or gate while the animal is in the passage 7 will also operate to close the said passage, so that the animal or bird cannot return to the enclosure 5, and the operation of the gate automatically by the animal or bird within the trap together with the parts cooperating with the gate will induce the animal to move forward and seek what may be instinctively supposed to be an outlet. This operation of the improved trap will be repeated automatically by the animals or birds entering the same and becoming trapped or imprisoned in the enclosure 6. At suitable intervals the trapped animals or birds may be removed from the chamber 6 and also the bait replenished in the box 36 whenever found necessary. It will be understood that when the plate 37 is lowered by the weight of an animal or bird thereon, the crank shaft or rod 48 will be operated and similarly actuate the crank arm 51 and angular terminal 52 thereof, as hereinbefore explained.

What is claimed as new is:

1. In a trap of the class specified, the combination of a receiving enclosure for temporary confinement of a trapped animal, an imprisoning enclosure adjacent to and having communication with the said receiving enclosure, an automatically operating closing gate hinged at one side to swing inwardly and outwardly and carrying automatically movable locking means at the opposite side and applied to the inlet of the receiving enclosure and when open shutting off communication between the receiving and imprisoning enclosures, and means for automatically opening, holding and automatically releasing and effecting a closing movement of the gate, said means being operable by the trapped animal passing into the receiving enclosure and from the latter to the imprisoning enclosure to effect the alternate closing and opening movements of the gate.

2. In a trap of the class specified, the combination of a receiving enclosure for temporary confinement of a trapped animal, an imprisoning enclosure adjacent to and having a passage in communication with said receiving enclosure, an automatically operating closing gate having hinge devices connected to one side and out of plumb, the gate being applied to the inlet of the receiving enclosure and when open closing communication between the receiving and imprisoning enclosures, locking means for holding the gate open and provided with trip devices in the receiving enclosure to release the gate and permit the latter to automatically close and open communication with the imprisoning closure means in said passage and engaging the gate to effect a release and automatic closure of said passage by the gate, and freely movable means cooperating with the imprisoning enclosure for preventing the trapped animal from returning to the receiving enclosure after the animal passes into the imprisoning enclosure.

3. In a trap of the class specified, the combination of a receiving enclosure for temporary confinement of a trapped animal, an imprisoning enclosure adjacent to and having a passage in communication with the receiving enclosure, an automatically operating gate disposed at the entrance to the receiving enclosure and having a sliding lock bolt, means for holding the gate open and including trip means in the receiving enclosure for releasing the gate and permitting the latter to have a self-closing movement, a tilting plate in the passage to the imprisoning enclosure, mechanism connected to the gate in part located in said passage and operable to release the bolt of the gate and effect automatic opening movement of the gate, and a further swinging gate in a part of the imprisoning enclosure to prevent return of the trapped animal to the receiving enclosure.

4. In a trap of the class specified, a receiving enclosure having an automatically operating gate at the entrance thereto, the gate being hinged at one side and arranged to swing inwardly at an upward angle of inclination to effect an automatic closure of the gate when released, means in the receiving enclosure for holding the gate open and also for releasing the same, locking means applied to the gate, an imprisoning enclosure adjacent to and having a passage in communication with the receiving enclosure, a tilting plate mounted in the said passage, lever mechanism between the tilting plate and the locking means of the gate to release said locking means through the weight of the trapped animal for re-setting the trap by opening the receiving enclosure, and means in the imprisoning enclosure for preventing the trapped animal from returning to the said passage and the receiving enclosure.

5. In a trap of the class specified, a receiving enclosure having a gate at the inlet end thereof, the gate being hinged at one side and arranged to swing inwardly at an upward angle of inclination, an imprisoning enclosure having a passage in communication with the receiving enclosure, the gate when open closing the passage and communication thereof with the receiving enclosure, and mechanisms in the two enclosures and passage for releasing the gate and permitting the latter to automatically close and also for effecting an opening movement of the gate by the trapped animal for the purpose of re-setting the trap for entrance thereinto of another animal.

In testimony whereof I have hereunto set my hand in presence of two subscribing witnesses.

BENJAMIN PARKER.

Witnesses:
RICHARD SPARROW,
FRED H. LAMBERT.